United States Patent
Kobyakov et al.

(10) Patent No.: US 12,479,176 B2
(45) Date of Patent: Nov. 25, 2025

(54) FABRICATION METHODS OF A LUNEBURG LENS

(71) Applicant: CORNING INCORPORATED, Corning, NY (US)

(72) Inventors: Andrey Kobyakov, Painted Post, NY (US); Gregory Kobyakov, Austin, TX (US)

(73) Assignee: CORNING INCORPORATED, Corning, NY (US)

( * ) Notice: Subject to any disclaimer, the term of this patent is extended or adjusted under 35 U.S.C. 154(b) by 242 days.

(21) Appl. No.: 18/381,770

(22) Filed: Oct. 19, 2023

(65) Prior Publication Data

US 2024/0131811 A1  Apr. 25, 2024
US 2024/0227329 A9  Jul. 11, 2024

Related U.S. Application Data

(60) Provisional application No. 63/418,091, filed on Oct. 21, 2022.

(51) Int. Cl.
*B29D 11/00* (2006.01)
*B33Y 80/00* (2015.01)
(Continued)

(52) U.S. Cl.
CPC ........ *B29D 11/00355* (2013.01); *B33Y 80/00* (2014.12); *G02B 3/0087* (2013.01); *B33Y 10/00* (2014.12)

(58) Field of Classification Search
CPC .. B29D 11/00355; B33Y 80/00; G02B 3/0087
See application file for complete search history.

(56) References Cited

U.S. PATENT DOCUMENTS 5,677,796 A   10/1997  Zimmerman et al.
6,549,340 B1   4/2003  Hirtzlin et al.
(Continued)

FOREIGN PATENT DOCUMENTS

WO   2020/218927 A1   10/2020
WO   2021/023555 A1    2/2021
(Continued)

OTHER PUBLICATIONS

Ansari et al; "3D Luneberg Lens Antenna With Layered Structure for High-Gain Communication Systems"; 2021 15th European Conference on Antennas and Propagation (EuCAP), Dusseldorf, Germany, 2021, pp. 1-4.
(Continued)

*Primary Examiner* — James Sanders
(74) *Attorney, Agent, or Firm* — Svetlana Z. Short

(57) ABSTRACT

Methods of forming Luneburg lenses and Luneburg lenses formed from same are provided. One method includes providing a spherical core formed of a material with a substantially uniform dielectric constant from a center of the spherical core to an outer surface of the spherical core. The method further includes forming a plurality of holes that are substantially uniform in size and symmetrically located about the center of the spherical core. The method further includes forming an at least one outer layer that is substantially spherical by winding a filament formed of a low-loss material around the spherical core.

14 Claims, 17 Drawing Sheets

(51) Int. Cl.
*G02B 3/00* (2006.01)
*B33Y 10/00* (2015.01)

(56) References Cited

U.S. PATENT DOCUMENTS

| | | | |
|---|---|---|---|
| 7,646,551 | B2 | 1/2010 | Li et al. |
| 11,283,186 | B2 | 3/2022 | Galla et al. |
| 11,385,384 | B2 | 7/2022 | Diehl et al. |
| 2004/0061948 | A1 | 4/2004 | Strickland |
| 2008/0191952 | A1 | 8/2008 | Tokoro et al. |
| 2014/0227517 | A1* | 8/2014 | De La Lama Gomez .......... D04H 1/64 428/378 |
| 2020/0083612 | A1 | 3/2020 | Diehl et al. |

FOREIGN PATENT DOCUMENTS

| | | |
|---|---|---|
| WO | 2021/034269 A1 | 2/2021 |
| WO | 2021/044260 A1 | 3/2021 |

OTHER PUBLICATIONS

Himdi et al., "Design Optimization of Multishell Luneburg Lenses," in IEEE Transactions on Antennas and Propagation, vol. 55, No. 2, pp. 283-289.

Ingerson, "Luneberg lenses performance limitations due to fabrication process," IEEE Antennas and Propagation Society International Symposium 1997. Digest, Montreal, QC, Canada, vol. 2, 1997, pp. 862-865.

Lacik et al., "Performance Comparison of W-band Luneburg Lens Antenna: Additive versus Subtractive Manufacturing," 2021 20th International Conference on Microwave Techniques (COMITE), Brno, Czech Republic, 2021, pp. 1-6.

Mirotznik et al., "Additive Manufacturing of Luneburg Lens Antennas Using Space-Filling Curves and Fused Filament Fabrication," in IEEE Transactions on Antennas and Propagation, vol. 66, No. 6, pp. 2818-2827.

Moore, "Luneberg lens design: optimization using effective medium theories," International Symposium on Antennas and Propagation Society, Merging Technologies for the 90's, Dallas, TX, USA, vol. 3, 1990, pp. 1188-1191.

Nie et al., "The design of layered luneberg lens with radially-drilled-hole-structure," 2013 Cross Strait Quad-Regional Radio Science and Wireless Technology Conference, Chengdu, 2013, pp. 226-229.

Norooziarab et al., "Millimeter-wave 3D Printed Luneburg Lens Antenna," 2019 IEEE Radio and Antenna Days of the Indian Ocean (RADIO), Reunion, France, 2019, pp. 1-2.

Safieddin et al., (2020). "A High Gain Beam-Steering Luneburg Lens Antenna For 76-81 GHz", Automotive Radars, pp. 1615-1616.

Tentzeris, "3D-Printed Omnidirectional Luneburg Lens Retroreflectors for Low-Cost mm-Wave Positioning," 2020 IEEE International Conference on RFID (RFID), Orlando, FL, USA, 2020, pp. 1-7.

Teruel et al., "Additive Manufactured Three Dimensional Luneburg Lens for Satellite Communications," 2019 13th European Conference on Antennas and Propagation (EuCAP), Krakow, Poland, 2019, pp. 1-4.

Thornton et al., "Frequency performance of 4-layer discretized Luneburg antennas," 2016 IEEE-APS Topical Conference on Antennas and Propagation in Wireless Communications (APWC), Cairns, QLD, Australia, 2016, pp. 177-180.

Xin et al., "Direction of arrival (DOA) estimation system using 3D printed Luneburg lens," 2016 IEEE/ACES International Conference on Wireless Information Technology and Systems (ICWITS) and Applied Computational Electromagnetics (ACES), Honolulu, HI, USA, 2016, pp. 1-2.

Xin et al., "Millimeter wave luneburg lens antenna fabricated by polymer jetting rapid prototyping," 2014 39th International Conference on Infrared, Millimeter, and Terahertz waves (IRMMW-THz), Tucson, AZ, USA, 2014, pp. 1-1.

* cited by examiner

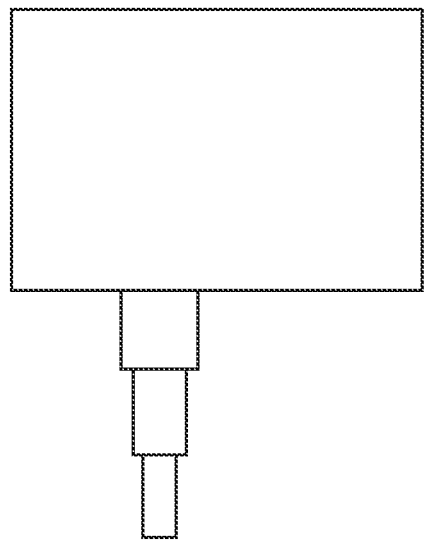
104
Forming a plurality of holes that are substantially uniform in size and symmetrically located about the center of the spherical core
Stepped Drill
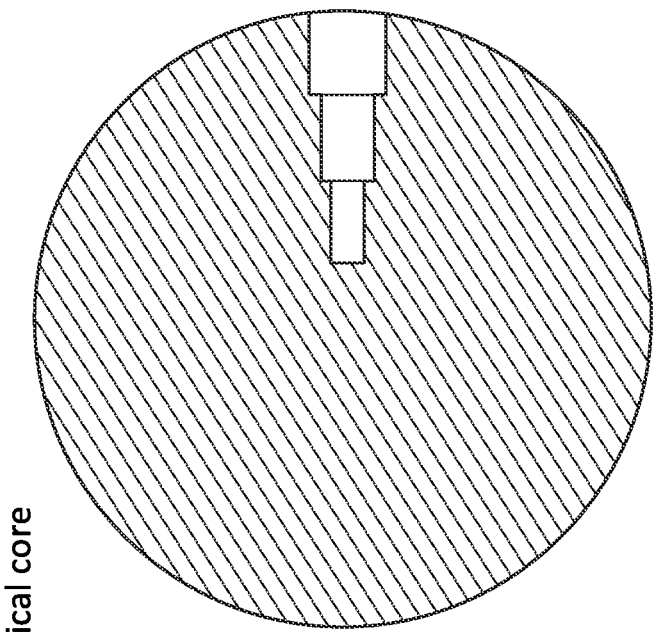
102
Providing a spherical core formed of a material with a substantially uniform dielectric constant from a center of the spherical core to an outer surface of the spherical core
Spherical Core
100
FIG. 12

FABRICATION METHODS OF A LUNEBURG LENS

CROSS-REFERENCE TO RELATED APPLICATIONS

This application claims the benefit of priority under 35 U.S.C. § 119 of U.S. Provisional Application No. 63/418,091 filed Oct. 21, 2022, the content of which is incorporated herein by reference in its entirety.

FIELD

The present disclosure generally relates to methods of fabricating a Luneburg lens and Luneburg lenses formed from same.

BACKGROUND

A Luneburg lens is a spherical gradient-index lens that has traditionally been utilized in radio-frequency applications, communication systems, and a variety of other fields. The gradient-index is finely tuned such that the lens can focus an incoming plane wave at a focal point on or near a lens surface that is opposite the direction of arrival. The focusing principle by which the lens operates includes providing a gradient dielectric constant, or permittivity, that decreases from a center of the lens to the surface. Generally, the center of the lens includes a dielectric constant of 2 and progressively reduces to a dielectric constant of 1 at the surface. In this manner, the focal point resides on the surface of the lens that is opposite the direction of the plane wave.

Numerous methods of fabrication have been implemented since the inception of the Luneburg lens. One popular method includes forming a layered structure of concentric shells with each shell having a progressively smaller dielectric constant from the center to the surface. Other methods include forming conical apertures within the lens or 3D printing complicated structures within the spherical architecture. While these methods result in operational lenses, they are relatively complicated to produce and require significant resources.

Accordingly, there is a continuing need to provide simplified methods of fabrication.

SUMMARY

The present disclosure provides methods of fabricating a Luneburg lens and Luneburg lenses formed from same.

According to one embodiment, a method of forming a Luneburg lens is provided. The method includes providing a spherical core formed of a material with a substantially uniform dielectric constant from a center of the spherical core to an outer surface of the spherical core. The method further includes forming a plurality of holes that are substantially uniform in size and symmetrically located about the center of the spherical core. The method further includes forming an at least one outer layer that is substantially spherical by winding a filament formed of a low-loss material around the spherical core.

According to another embodiment, a method of forming a Luneburg lens is provided. The method includes providing a spherical core formed of a material with a substantially uniform dielectric constant from a center of the spherical core to an outer surface of the spherical core. The method further includes forming a plurality of holes substantially uniform in size and symmetrically located about the center of the spherical core. Each of the holes are formed to have a plurality of segments, and each segment has a length and a cross-section along the length that is substantially uniform. Each cross-section is larger than an adjacent cross-section in a direction from the center of the spherical core towards the outer surface of the spherical core.

According to yet another embodiment, a method of forming a Luneburg lens is provided. The method includes providing a spherical core formed of a material with a substantially uniform dielectric constant from a center of the spherical core to an outer surface of the spherical core. The method further includes forming a plurality of outer layers that are each substantially spherical by winding a filament into a plurality of coils. The coils in at least one outer layer are located on a substantially common circumference and do not cross one another.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 12 is a front view of a process of forming a plurality of holes in a core in accordance with one aspect of the disclosure;

DETAILED DESCRIPTION

Figure 1:
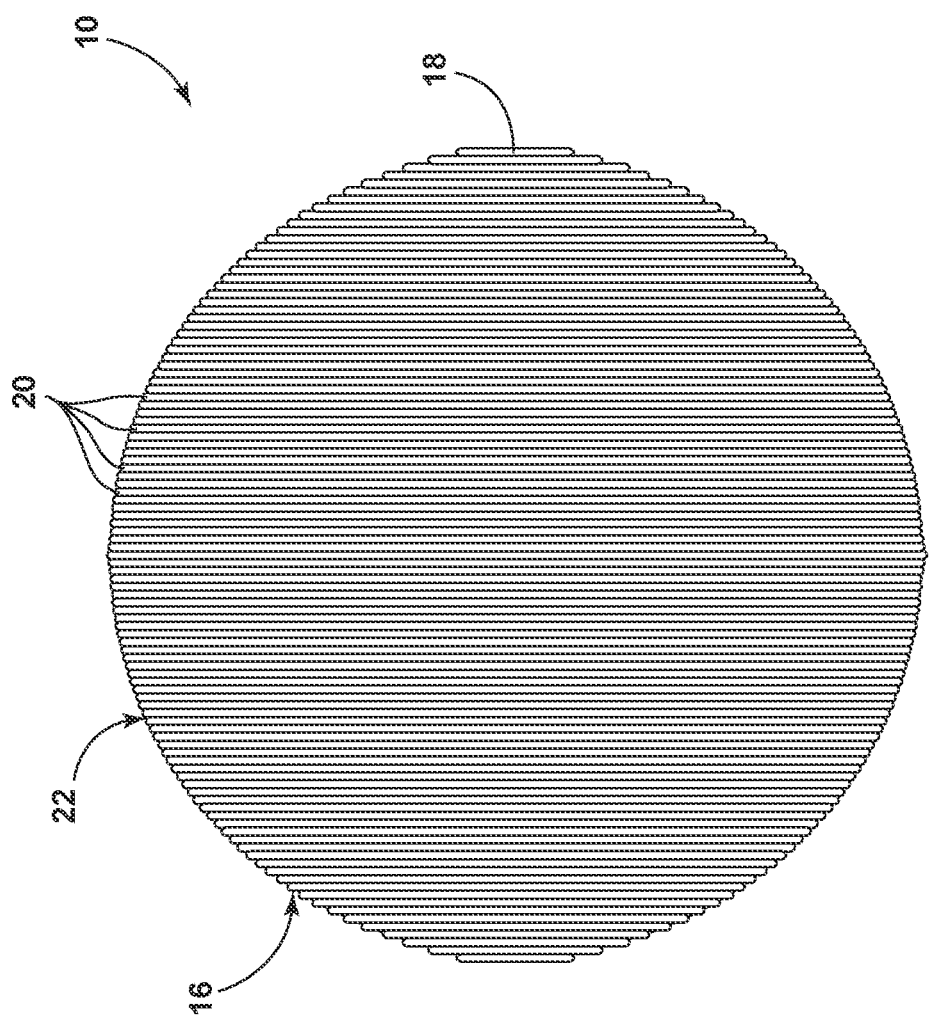
FIG. 1 is a front view of a Luneburg lens with a filament winding having a first pattern of the coils in accordance with one aspect of the disclosure.

Reference will now be made in detail to the present preferred embodiments, examples of which are illustrated in the accompanying drawings. Whenever possible, the same reference numerals will be used throughout the drawings to refer to the same or like parts.

The present disclosure generally relates to methods of fabricating a Luneburg lens and Luneburg lenses formed from same. The following terms as used herein have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error, production limitations, and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The term "Luneburg lens" is a spherical lens with a radial inhomogeneous distribution of dielectric constant (i.e., permittivity) with a focal point located on the lens surface. A radial variation of permittivity obeys a quadratic law as shown below in Eq. 1:

$$\epsilon_L(r) = 2 - \left(\frac{r}{R}\right)^2 \qquad \text{(Eq. 1)}$$

where r is the distance from the lens center and R is the outer radius of the lens. Therefore, the permittivity of the lens gradually changes from 2 in a lens center to 1 (e.g., air) on an outer surface. The Luneburg lens can operate in a broad range of frequencies, but the size is generally large compared to the free-space wavelength.

Figure 2:
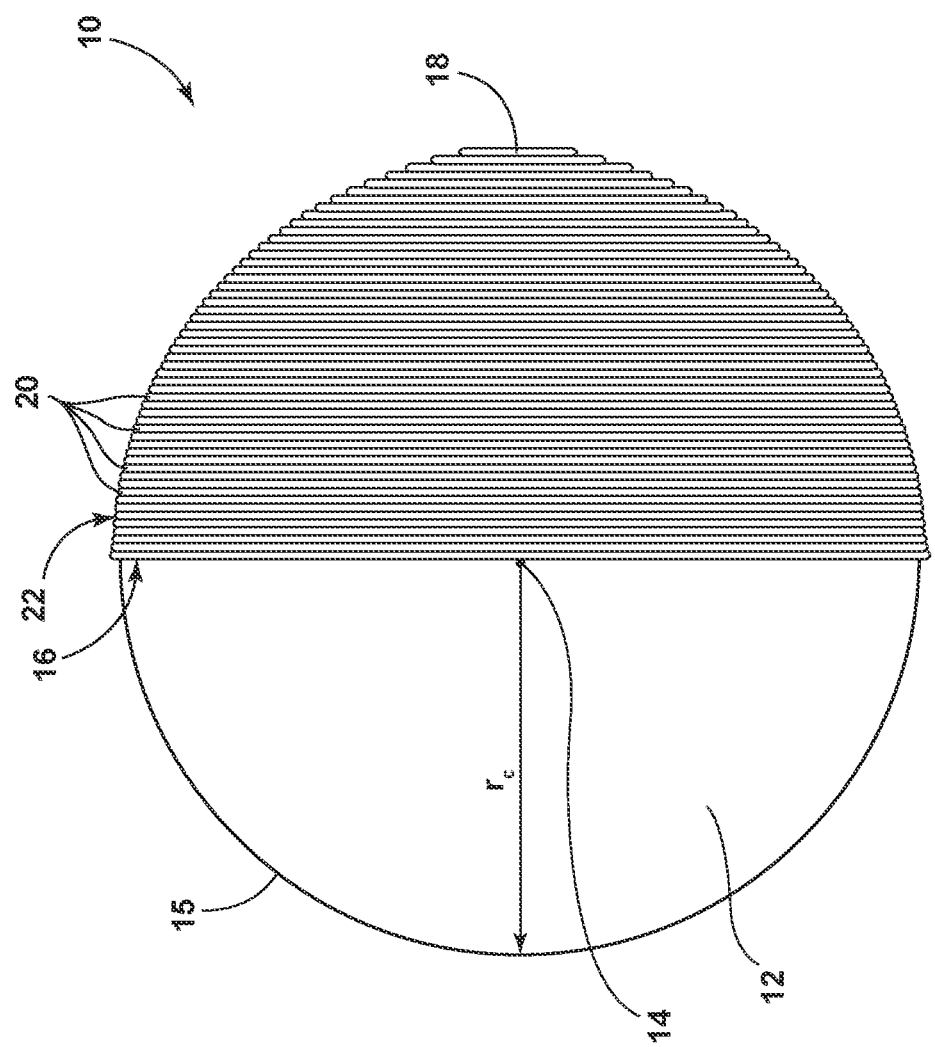
FIG. 2 is a front view of a Luneburg lens with a filament winding partially removed illustrating a spherical core in accordance with one aspect of the disclosure.

Referring to FIGS. 1-2, reference numeral 10 generally designates a Luneburg lens. The Luneburg lens 10 includes a substantially spherical construction and includes a spherical core 12 of a substantially solid material. The spherical core 12 includes center 14 and a radius "$r_c$" extending from the center 14 to an outer surface 15. The radius $r_c$ may be equal to about 100 mm or more, about 90 mm or less, about 80 mm or less, about 70 mm or less, about 60 mm or less, about 50 mm or less, about 45 mm or less, about 40 mm or less, about 35 mm or less, about 30 mm or less, about 10 mm or more, about 15 mm or more, about 20 mm or more, about 25 mm or more, or between about 15 mm and about 60 mm. The spherical core 12 includes a substantially uniform permittivity from the center 14 to the outer surface 15. For example, the spherical core 12 may exhibit a dielectric constant of greater than about 2, between about 2 and about 5, between about 2 and about 3, about 2.1, or about 2. To obtain a uniform dielectric constant, the spherical core 12 may be substantially solid and formed from a material that is homogenous. For example, in some embodiments, the spherical core 12 may be formed from a solid polytetrafluoroethylene ("PTFE") material. The Luneburg lens 10 includes at least one outer layer 16 formed of a filament 18 that has been wound into several coils 20. In some embodiments, the at least one outer layer 16 may include a plurality of outer layers. In some embodiments, the filament 18 may be a single integral body. In some embodiments, the filament 18 may include one or more filaments 18.

The filament 18 is formed from a material that exhibits low-loss (e.g., at radio frequency of between about 20 kHz and about 300 GHz), for example, a material with a dielectric constant of about 100 μm or greater, for example, about 125 μm or greater, or between about 100 μm and 300 μm. In some embodiments, the filament 18 may be formed of an optical fiber. For example, an optical fiber may be defined as a waveguide having a glass portion optionally surrounded by a coating. The glass portion includes a core and a cladding. The cladding surrounds and is directly adjacent to the core and includes two or more concentric regions that differ in relative refractive index. The relative refractive index of the core is greater than the relative refractive index of the cladding. In other embodiments, the filament may be formed from other materials, such as at least one of polylactide ("PLA"), polyethylene terephthalate glycol ("PETG"), or other flexible, low-loss, dielectric materials.

Figure 4:
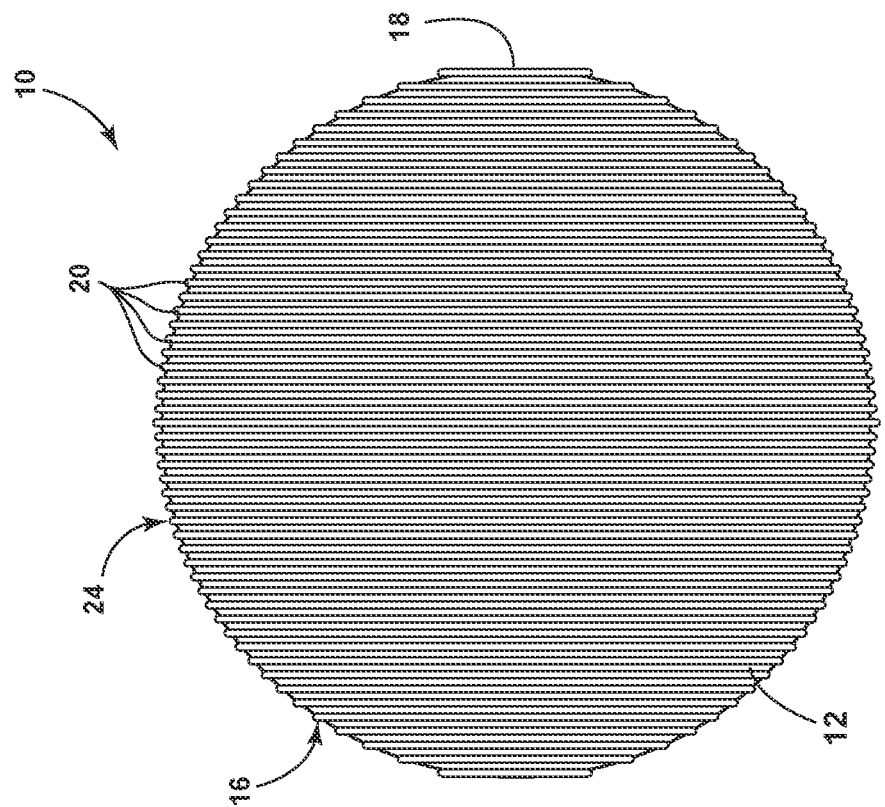
FIG. 4 is a front view of a Luneburg lens with a filament winding having a third pattern of the coils in accordance with one aspect of the disclosure.
Figure 3:
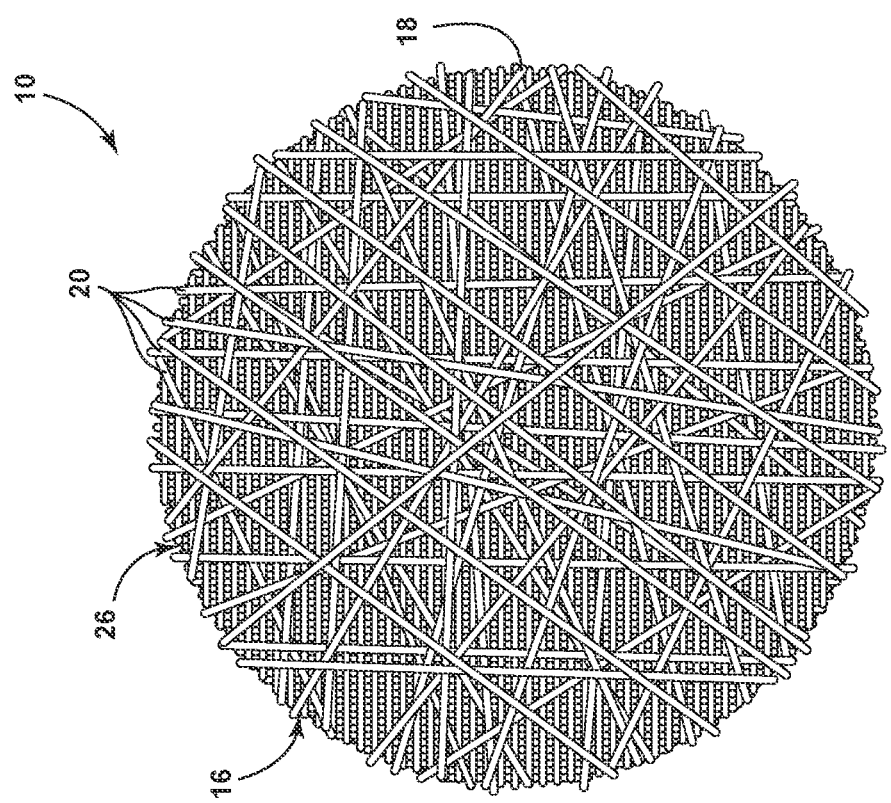
FIG. 3 is a front view of a Luneburg lens with a filament winding having a second pattern of the coils in accordance with one aspect of the disclosure.

The coils 20 may be wound into a variety of different patterns. For example, FIGS. 1 and 2 illustrate a first pattern of the coils 22 that are densely packaged such that each coil 20 in one of the outer layers 16 (e.g., the innermost outer layer 16) is substantially in abutting relationship with adjacent coils 20 along a substantially common circumference. In this manner, little to no spacing is provided between adjacent coils 20 and the spherical core 12 is substantially enclosed by the coils 20. As such, the coils 20 on the common circumference may not cross each other. With continued reference to FIGS. 1 and 2, the at least one outer layer 16 may include a plurality of outer layers of coils 20 stacked on top of one another with coils 20 in each progressively outer layer defining a larger substantially common circumference. Each progressively outer layer 16 may include coils 20 that are substantially aligned with coils 20 of an adjacent outer layer 16 or are provided in a crossing relationship. FIG. 3 illustrates a second pattern of the coils 24 that are loosely packaged such that each coil 20 in the at least one outer layer 16 (e.g., the innermost outer layer 16) is spaced from an adjacent coil 20 along a substantially common circumference. Each spacing may be substantially uniform such that each coil 20 in one of the outer layers 16 resides on the common circumference that do not cross each other. With continued reference to FIG. 3, the at least one outer layer 16 may include a plurality of outer layers 16 of coils 20 stacked on top of one another with coils 20 in each progressively outer layer 16 defining a larger substantially common circumference. Each progressively outer layer 16 may include coils 20 that are substantially aligned with coils 20 of an adjacent outer layer 16 or are provided in a crossing relationship. FIG. 4 illustrates a third pattern of the coils 26 where the at least one outer layer 16 includes a plurality of outer layers 16 of coils 20 stacked on top of one another. The coils 20 in each progressively outer layer 16 define a larger substantially common circumference in a crossing relationship with an inwardly adjacent outer layer 16 such that the Luneburg lens 10 includes at least two outer layers 16 with coils 20 that cross one another.

In accordance with the patterns of coils 22, 24, 26 illustrated in FIGS. 2-4, the outer layer 16 may include 200 or more outer layers, 150 or more outer layers, 100 or more out layers, 50 or more outer layers, 25 or more outer layers, 10 or more outer layers, 5 or more outer layers, 2 or more outer layers, or a single outer layer. In some embodiments, a single Luneburg lens 10 may include a plurality of outer layers 16 that include two or more of the patterns of coils 22, 24, 26. The spherical core 12 may include a dielectric constant of between about 2 and more than about 1, whereas the outermost layer 16 may be sized and distributed to define a permittivity of about 1. The number of coils 20 in each subsequent outer layer 16 may begin to decrease towards the outermost layer 16. In this manner, the plurality of outer layers 16 may provide a radial inhomogeneous distribution (i.e., a gradient) of permittivity in accordance with Eq. (1) as a result of progressively fewer coils 20 (i.e., and larger spaces between coils 20) in progressively outer layers 16. The innermost outer layer 16 may have a permittivity of between about 2 and about 1 (i.e., equal to or less than the permittivity of the outer surface 15). The coil 20 distribution in each outer layer 16 may be uniformly spaced along the substantially common circumference such that the overall permittivity of the Luneburg lens 10 is substantially symmetric from the center 14.

Figure 5A:
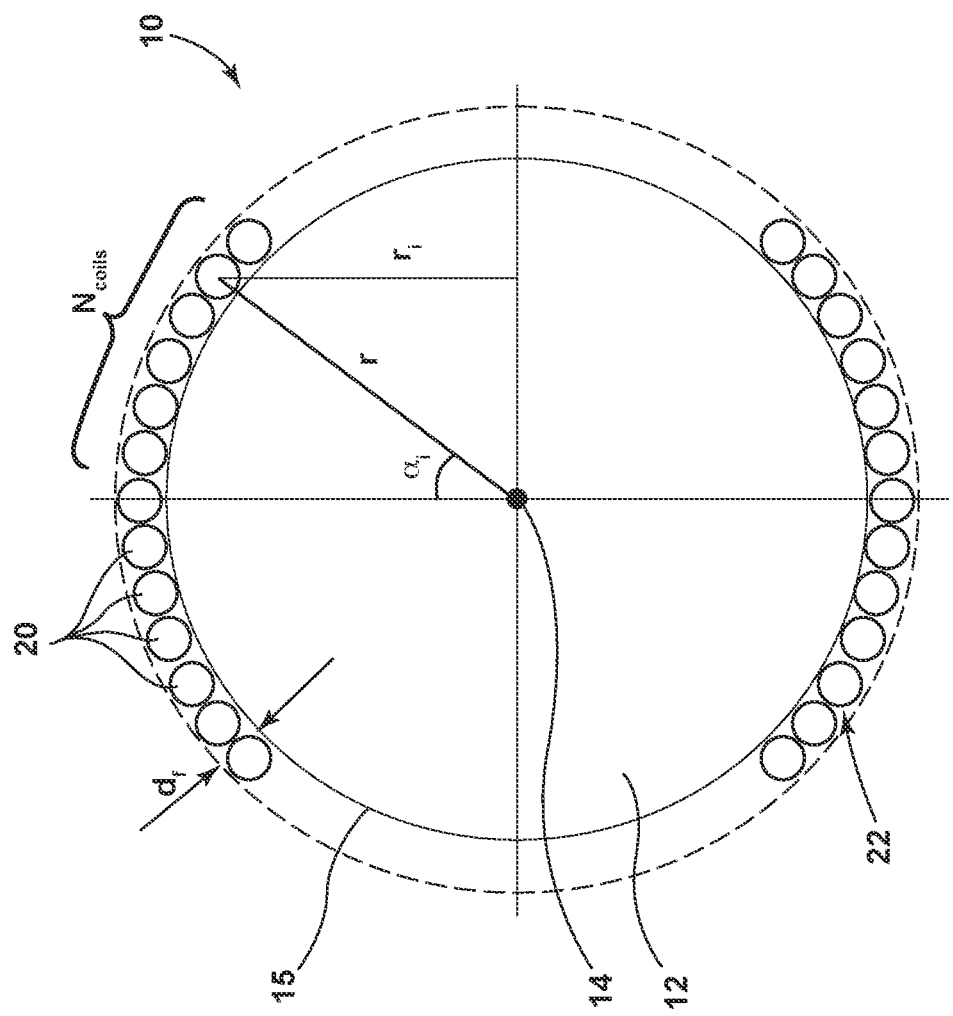
FIG. 5A is a cross-sectional front view of a fragment of the Luneburg lens with the first pattern of the coils in accordance with one aspect of the disclosure.
Figure 5C:
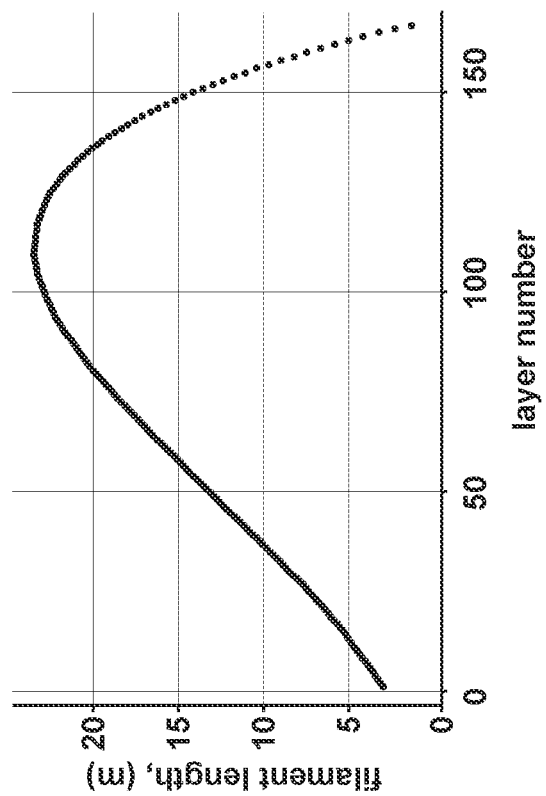
FIG. 5C is a graphical representation of a length of the filament per outer layer in accordance with one aspect of the disclosure.
Figure 5B:
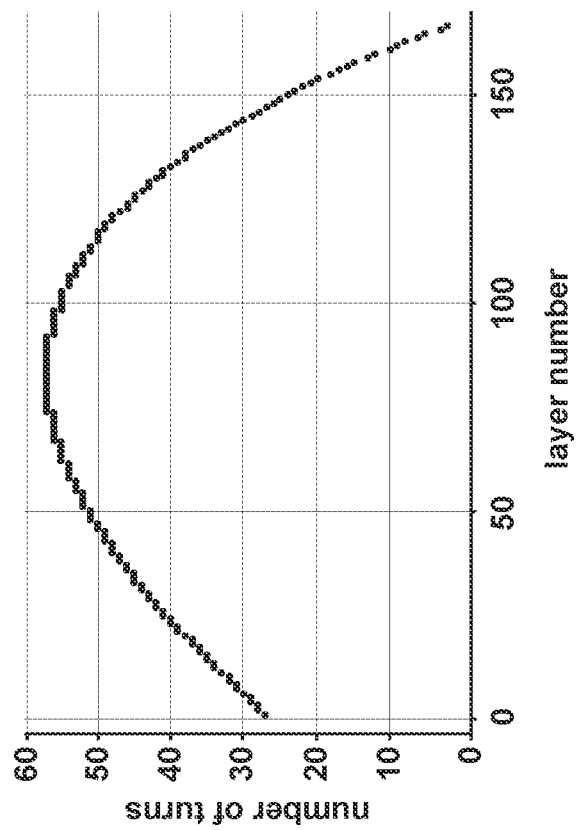
FIG. 5B is a graphical representation of coil distribution in the first pattern of the coils in a plurality of outer layers in accordance with one aspect of the disclosure.

With reference now to FIG. 5A, a cross-sectional front view of a fragment of the Luneburg lens 10 is illustrated with the first pattern of the coils 22. The filament 18 may be substantially cylindrical such that it defines a diameter "$d_f$" In some embodiments, the filament 18 includes a radius (as defined by the diameter $d_f$) that is equal to or less than about 0.1% of the core radius $r_c$, greater than about 0.1% of the core radius $r_c$, less than about 1% of the core radius $r_c$, greater than about 1% of the core radius $r_c$, equal to or less than about 2% of the core radius $r_c$, equal to or less than about 3% of the core radius $r_c$, equal to or less than about 4% of the core radius $r_c$, equal to or less than about 5% of the core radius $r_c$, or between about 0.5% and about 5% of the core radius $r_c$. In some embodiments, the filament 18 diameter $d_f$ may be greater than about 0.5 mm, less than about 2 mm, between about 0.5 mm and about 2 mm, or between about 0.7 mm and about 1 mm. With reference now to FIG. 5B, a graphical representation of coil 20 distribution (i.e., number of turns) in the first pattern of the coils 22 that includes a plurality of outer layers 16. The number of coils 20 in each subsequent outer layer 16 may begin to decrease towards the outermost layer 16. In this manner, the plurality of outer layers 16 may provide a radial inhomogeneous distribution of permittivity in accordance with Eq. (1) as a result of progressively fewer coils 20 (i.e., and larger spaces between coils 20) in progressively outer layers 16. As shown in FIG. 5C, a length of the filament 18 per outer layer 16 may be determined in accordance with the number of inwardly located outer layers 16, the coil 20 distribution (FIG. 6B) of the outer layer in question, the diameter $d_f$ of the filament 18, and the core radius $r_c$. In the provided example in FIGS. 5A-5C, the filament 18 comprises an optical fiber with a diameter $d_f$ of 0.242 mm and the core radius $r_c$ of 9.5 mm. The entire Luneburg lens 10 (i.e., core 12 and outer layer 16 combined) in the provided example has a radius of 50 mm.

Figure 6A:
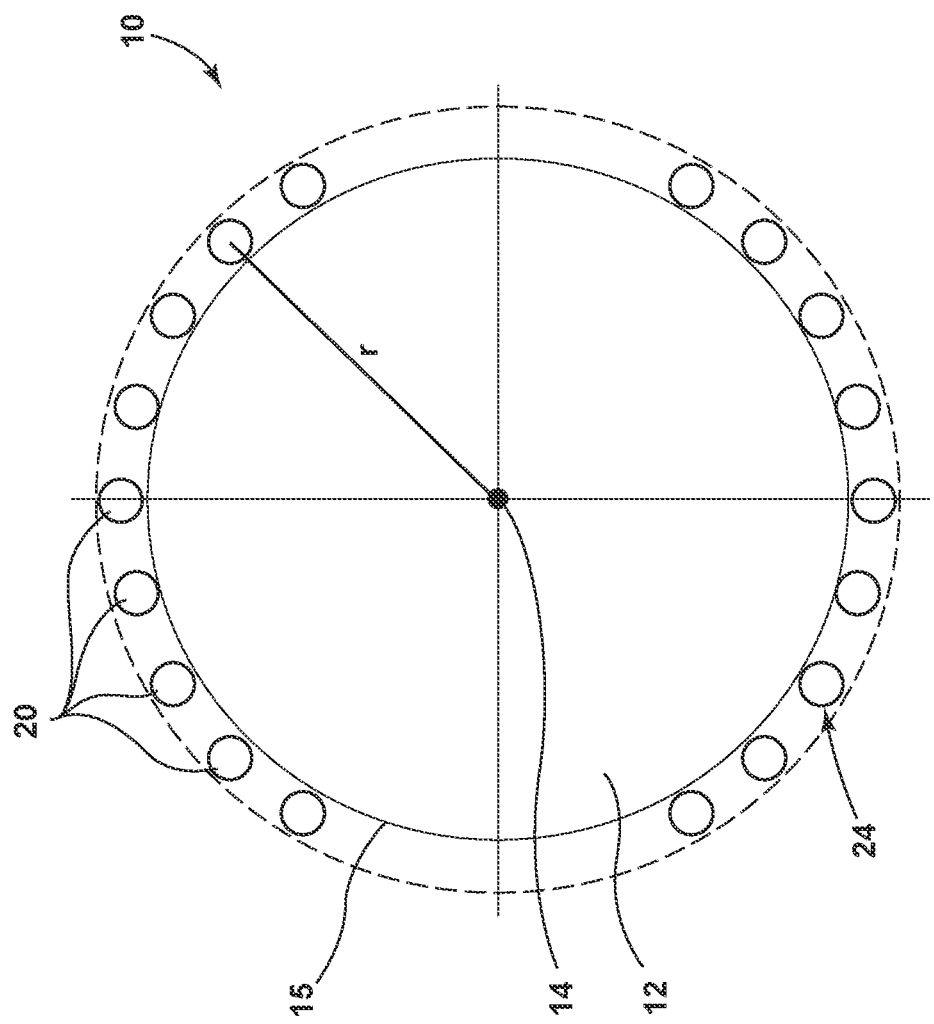
FIG. 6A is a cross-sectional front view of a fragment of the Luneburg lens with the second pattern of the coils in accordance with one aspect of the disclosure.
Figure 6B:
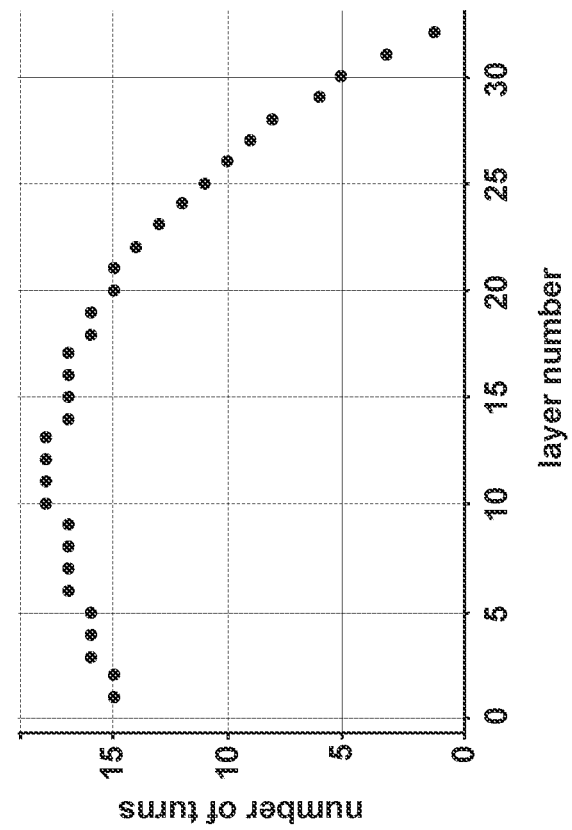
FIG. 6B is a graphical representation of coil distribution in the second pattern of the coils in a plurality of outer layers in accordance with one aspect of the disclosure.
Figure 6C:
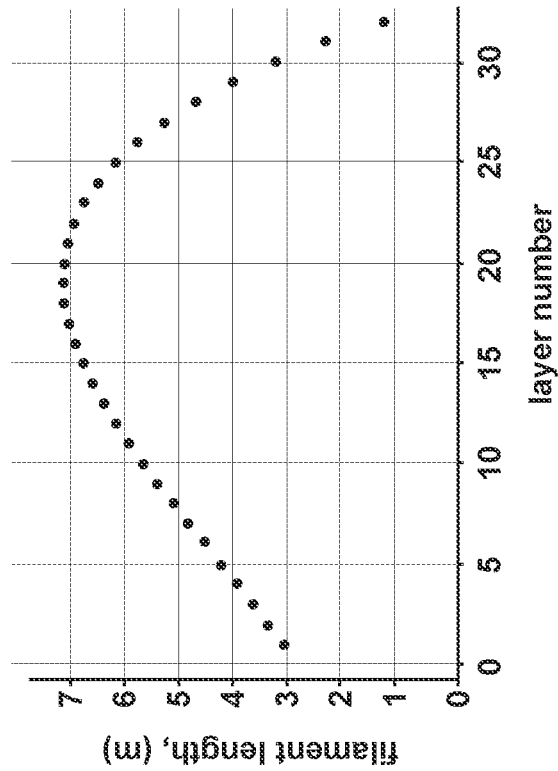
FIG. 6C is a graphical representation of a length of the filament per outer layer in accordance with one aspect of the disclosure.

With reference now to FIG. 6A, a cross-sectional front view of a fragment of the Luneburg lens 10 is illustrated with the second pattern of the coils 24. In the second pattern of the coils 24, the filament 18 may be substantially cylindrical such that it defines the diameter "$d_f$" with a size relative to the spherical core 12 as discussed above in relation to FIG. 5A. However, the coils 20 are loosely packed such that a space is provided between adjacent coils 20 in the innermost outer layer 16. With reference now to FIG. 6B, a graphical representation of coil 20 distribution (i.e., number of turns) in the second pattern of the coils 24 that includes a plurality of outer layers 16. The number of coils 20 in each subsequent outer layer 16 may begin to decrease towards the outermost layer 16. In this manner, the plurality of outer layers 16 may provide a radial inhomogeneous distribution of permittivity in accordance with Eq. (1) as a result of progressively fewer coils 20 (i.e., larger spaces between coils 20) in progressively outer layers 16. As shown in FIG. 6C, a length of the filament 18 per outer layer 16 may be determined in accordance with the number of inwardly located outer layers 16, the coil 20 distribution (FIG. 6B) of the outer layer 16 in question, the diameter $d_f$ of the filament 18, and the core radius $r_c$. In the provided example in FIGS. 6A-6C, the filament 18 comprises an PLA material with a diameter $d_f$ of 1.75 mm and the core radius $r_c$ of 18 mm. The entire Luneburg lens 10 (i.e., core 12 and outer layer 16 combined) in the provided example has a radius of 50 mm.

Figure 7:
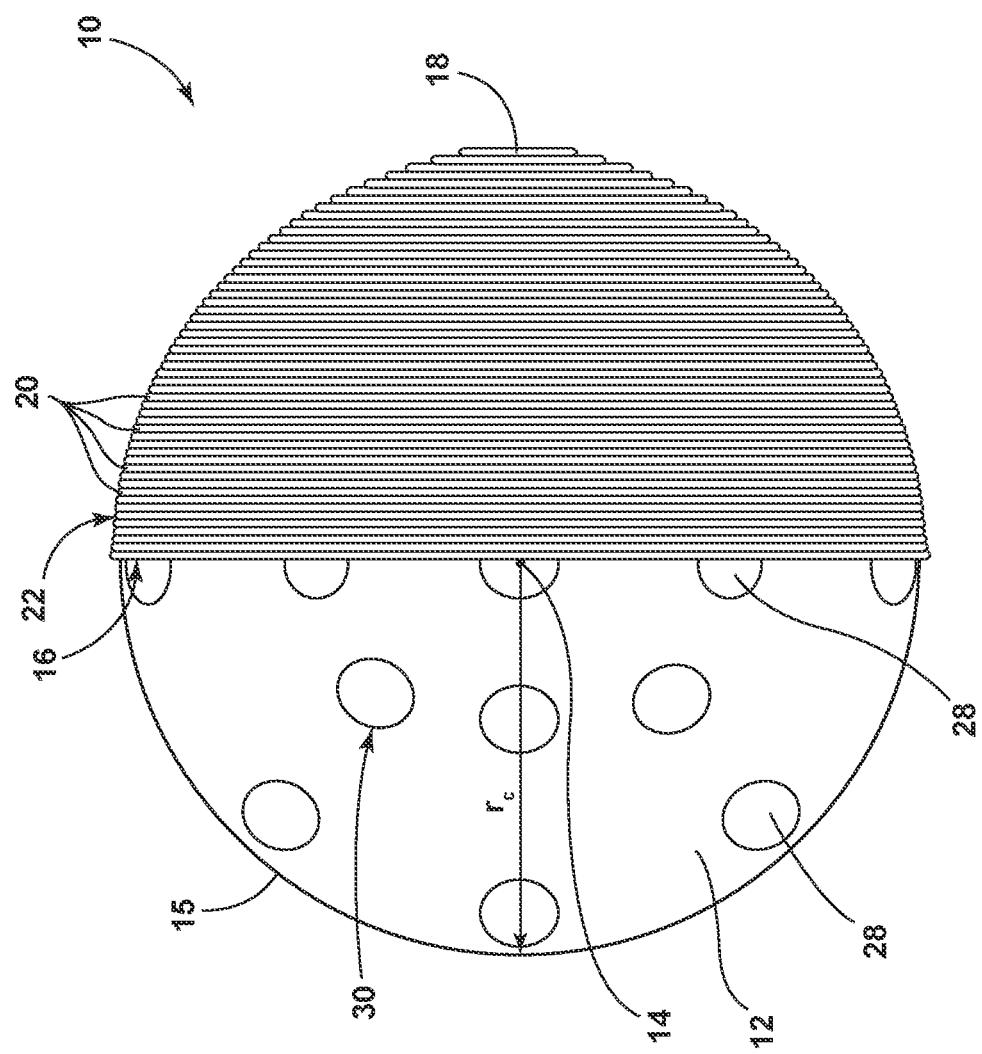
FIG. 7 is a front view of a Luneburg lens with a filament winding partially removed illustrating a spherical core defining a plurality of holes in a first hole distribution in accordance with one aspect of the disclosure.
Figure 9:
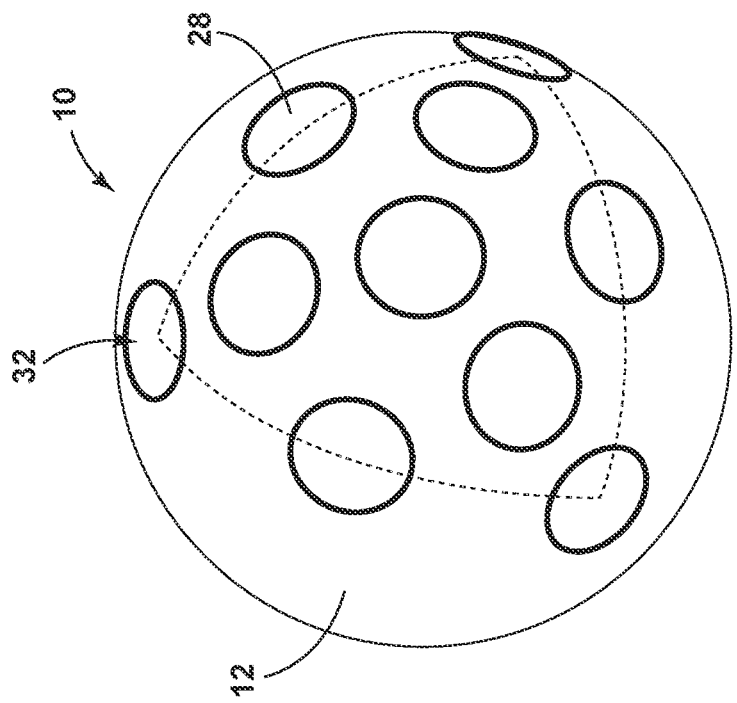
FIG. 9 is a front perspective view of a spherical core defining the plurality of holes in a second hole distribution in accordance with one aspect of the disclosure.
Figure 8:
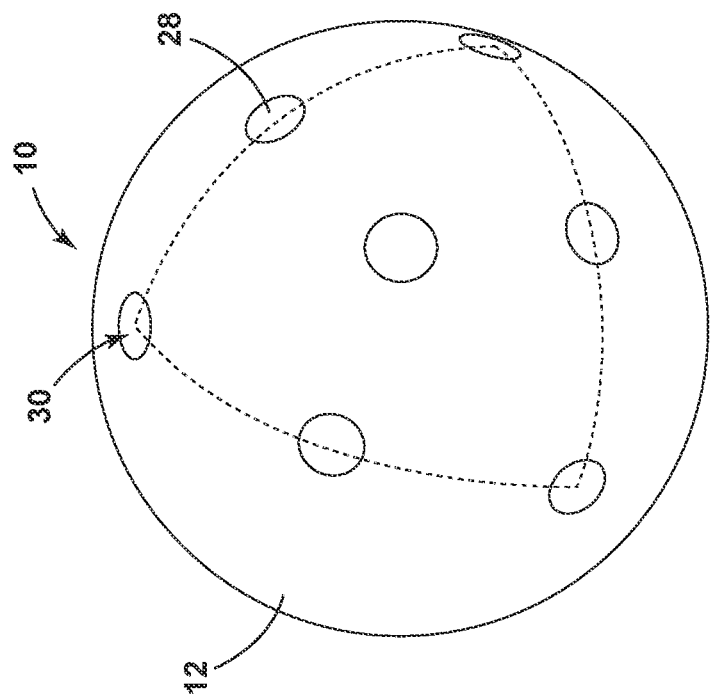
FIG. 8 is a front perspective view of the spherical core defining the plurality of holes in the first hole distribution in accordance with one aspect of the disclosure.

With reference now to FIG. 7, the Luneburg lens 10 is illustrated with the filament 18 partially unwound and a spherical core 12 defining a plurality of holes 28 in a first hole distribution 30. The plurality of holes 28 are substantially uniform in size and symmetrically located about the center 14 of the spherical core 12. Each of the holes 28 extends from the surface 15 towards the center 14 of the spherical core 12. In some embodiments, each of the holes 26 extend at least about 50% of the core radius $r_c$, for example, at least about 60%, at least about 70%, at least about 80%, at least about 85%, at least about 90%, at least about 95%, at least about 98%, between about 80% and about 95%, or between about 85% and about 98%. In such embodiments, the spherical core 12 in a region directly adjacent to the center 14 remains substantially solid. FIG. 8 is a front perspective view of the spherical core 12 defining the plurality of holes 28 in the first hole distribution 30. In some embodiments, each 1/8th triangular sector of the spherical core 12 includes one hole 28 located centrally therein and three holes 28 on each of the three sides of the triangular sector that are shared with adjacent triangular sectors (e.g., for a total of 26 holes 28). With reference now to FIG. 9, the spherical core 12 is illustrated defining the plurality of holes 28 in a second hole distribution 32 that is denser than the first hole distribution 30. More particularly, each 1/8th triangular sector of the spherical core 12 includes three holes 28 equally distributed therein and three holes 28 on each of the three sides of the triangular sector that are shared with adjacent triangular sectors (e.g., for a total of 50 holes 28).

Figure 10:
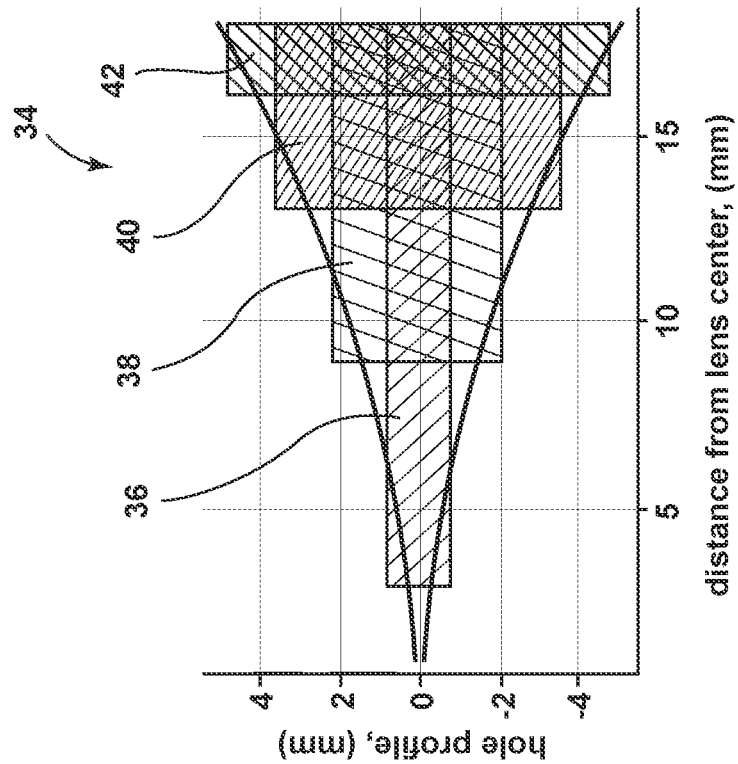
FIG. 10 is a graphical representation of one of the plurality of holes having a first construction in accordance with one aspect of the disclosure.

The holes 28 may be formed into a variety of different constructions. For example, FIG. 10 is a graphical representation of one of the plurality of holes 28 having a first hole construction 34. In the first hole construction 34, each hole includes a plurality of segments that include a first segment 36 that is located closest to the center 14, a second segment 38 that is between the first segment 36 and the surface 15, a third segment 40 that is located between the second segment 38 and the surface 15, and a fourth segment 42 that extends from the third segment 40 to the outer surface 15. Each segment 36, 38, 40, 42 extends about a longitudinal axis and defines a cross-section. More particularly, the first segment 36 includes a first cross-section that is the smallest, the second segment 38 includes a second cross-section that is the next smallest, the fourth segment 42 includes fourth cross-section that is the largest, and the third segment 40 includes a third cross-section that is the next largest. In this manner, each cross-section is larger than an adjacent cross-section in a direction from the center 14 of the spherical core 12 towards the surface 15 of the spherical core 12. In some embodiments, each or select segment cross-sections are larger than an adjacent, inwardly located segment cross-section by a magnitude of at least about 25%, at least about 30%, at least about 35%, at least about 40%, at least about 45%, at least about 50%, at least about 60%, at least about 70%, at least about 80%, at least about 90%, at least about 100%, or between about 50% and 100%.

With continued reference to FIG. 10, each segment 36, 38, 40, 42 includes a length and the segment cross-sections are substantially uniform along the length. For example, the first segment may define a first length and the first cross-section extends uniformly along the first length, the second segment may define a second length and the second cross-section extends uniformly along the second length, the third segment may define a third length and the third cross-section extends uniformly along the third length, and the fourth segment may define a fourth length and the fourth cross-section extends uniformly along the fourth length. In some embodiments, the segment lengths may be different. For example, the first length may be greater than the second length, the second length may be greater than the third length, and the third length may be greater than the fourth length. In some embodiments, each segment cross-section may define a cylindrical shape defining a radius. In some embodiments, the radius of the first segment cross-section is equal to or less than about 1% of the core radius $r_c$, greater than about 1% of the core radius $r_c$, between about 1% and about 15% of the core radius $r_c$, or between about 5% and about 10% of the core radius $r_c$ and adjacent, outwardly located segment cross-sections are larger by the magnitudes described above. The core radius $r_c$ in the illustrated example was about 18 mm.

Figure 11:
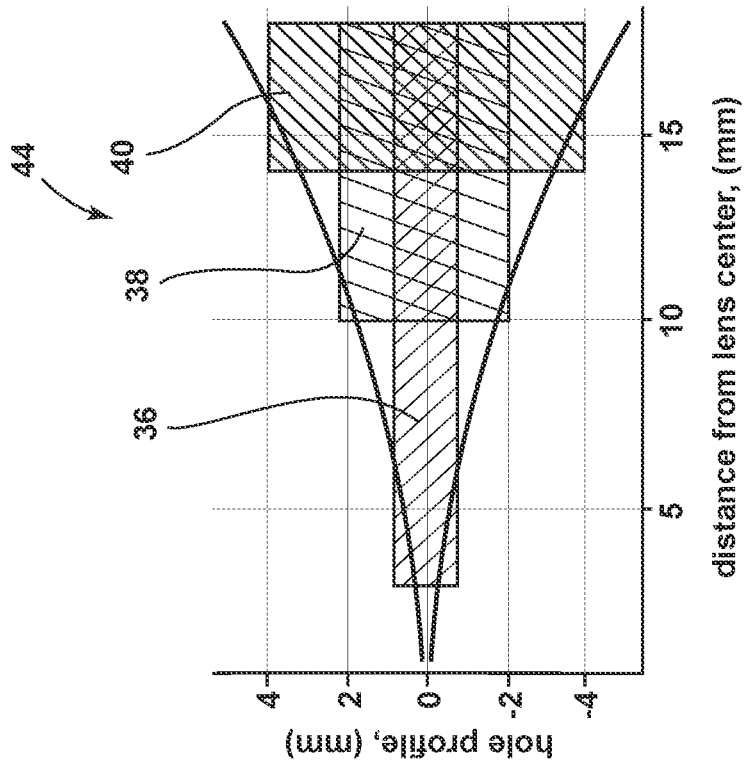
FIG. 11 is a graphical representation of one of the plurality of holes having a second construction in accordance with one aspect of the disclosure.

With reference now to FIG. 11 one of the plurality of holes 28 is illustrated having a second construction 44. In the section construction, there are three segments 36, 38, 40 that include the same relative dimensions as described above and the third segment 40 extends from the outer surface 15. However, it should be appreciated that each hole 28 may have alternative constructions including more or less segments (e.g., two or more segments, more than four segments, etc.) with each segment having a similar relative dimension as described above. In addition, it should be appreciated that the variety of hole constructions (e.g., the first hole construction 34 and the second hole construction 44) may be disposed in the first hole distribution 30 (FIG. 8), the second hole distribution 32 (FIG. 9), or any other symmetrically disposed distributions. In some embodiments, the first hole construction is disposed in the first hole distribution 30 and the second hole construction is disposed in the second hole distribution 32. The core radius $r_c$ in the illustrated example was about 18 mm.

With reference now to FIGS. 7-11, the hole construction 34, 44 and the hole distribution 30, 32 may be configured such that the outer surface 15 of the spherical core 12 has a dielectric constant of about 1 or greater. For example, in some embodiments, the outer surface 15 of the spherical core 12 has a dielectric constant of about 1 and the spherical core does not include an outer layer 16 as it already provides a radial inhomogeneous distribution (i.e., a gradient) of permittivity in accordance with Eq. (1). In other embodiments, the outer surface 15 of the spherical core 12 has a dielectric constant of greater than about 1 and includes at least one outer layer 16 including an outermost layer 16 with a dielectric constant of about 1. In this manner, a spherical core 12 with one of the hole constructions 34, 44 and one of the hole distributions 30, 32 may be utilized to require a fewer number of outer layers 16 than a spherical core 12 of like material and size without holes 28.

In accordance with FIGS. 1-11, a variety of Luneburg lenses may be provided. In accordance with a first example construction, a Luneburg lens 10 may include at least one outer layer 16 with a filament 18 winding comprising the first pattern of the coils 22, the second pattern of the coils 24, or the third pattern of the coils 26. The filament 18 may be formed from at least one of PLA or PETG or formed of an optical fiber. In the first example, the Luneburg lens 10 includes a spherical core 12 without any holes 38. The spherical core 12 may be formed from a solid PTFE material. In accordance with a second example construction, a Luneburg lens 10 includes a spherical core 12 with a plurality of holes 38 that are symmetrically distributed about a center 14 of the spherical core 12. The spherical core 12 may be formed from a solid PTFE material. Each of the holes 38 may have a configuration comprising the first hole construction, the second hole construction, a construction with two or more segments, or a construction with four or more segments. The plurality of holes 38 may include a distribution comprising one of the first hole distribution 30 or the second hole distribution 32. In the second example, the Luneburg lens 10 does not include an outer layer 16 with a filament 18 winding. In accordance with a third example construction, a Luneburg lens 10 may include at least one outer layer 16 with a filament 18 winding comprising the first pattern of the coils 22, the second pattern of the coils 24, or the third pattern of the coils 26. The filament 18 may be formed from at least one of PLA or PETG or formed of an optical fiber. In the third example, the Luneburg lens 10 includes a spherical core 12 with a plurality of holes 38 that are symmetrically distributed about a center 14 of the spherical core 12. The spherical core 12 may be formed from a solid PTFE material. Each of the holes 38 may have a configuration comprising of the first hole construction, the second hole construction, a construction with two or more segments, or a construction with four or more segments. The plurality of holes 38 may include a distribution comprising one of the first hole distribution 30 or the second hole distribution 32.

With reference now to FIGS. 12-15, a first method 100 of forming a Luneburg lens is illustrated. As shown in FIG. 12, and by reference numeral 102, a spherical core is provided that is formed of a material with a substantially uniform dielectric constant from a center of the spherical core to an outer surface of the spherical core. For example, the spherical core may be formed of PTFE material. At step 104, a plurality of holes are formed that are substantially uniform in size and symmetrically located about the center of the spherical core. For example, each of the holes may be formed to have a configuration comprising a first hole construction, a second hole construction, a construction with two or more segments, or a construction with four or more segments. The plurality of holes may include a distribution comprising one of a first hole distribution or a second hole distribution.

Figure 13:
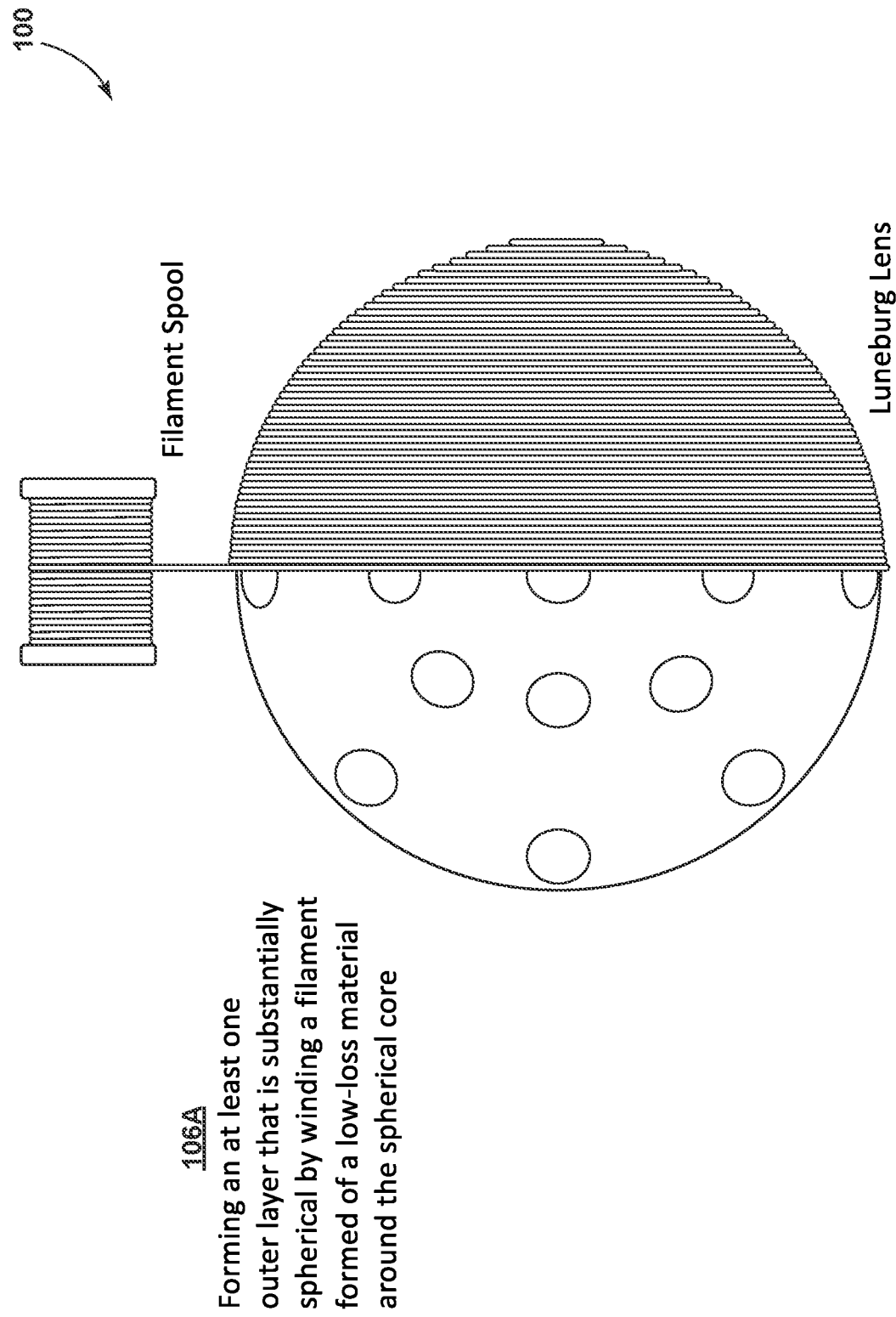
FIG. 13 is a front view of a first process of forming an outer layer including a filament winding about a core in accordance with one aspect of the disclosure.
Figure 14:
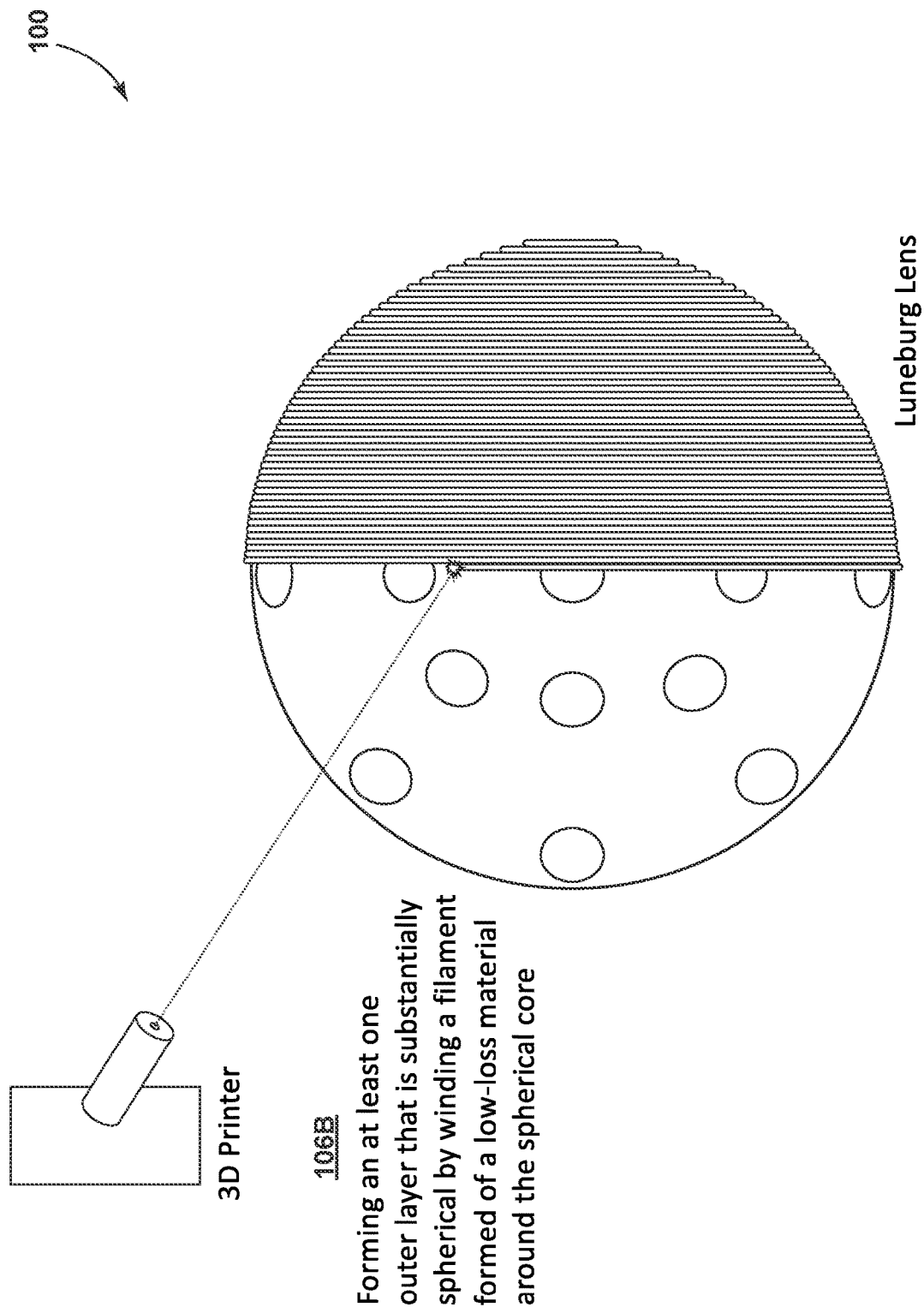
FIG. 14 is a front view of a second process of forming an outer layer including a filament winding about a core in accordance with one aspect of the disclosure.

With reference now to FIGS. 13 and 14, and by reference numeral 106A or 106B, at least one outer layer is formed that is substantially spherical by winding a filament formed of a low-loss material around the spherical core. For example, the filament winding may be formed in the first pattern of the coils, a second pattern of the coils, or a third pattern of the coils. The filament may be formed from at least one of PLA or PETG or formed of an optical fiber. With specific reference to FIG. 13, at 106A, the winding of the filament may be conducted by wrapping an already-formed filament around the spherical core. For example, the already-formed filament may be unspooled and/or otherwise uncoiled and wrapped around the spherical core. In some embodiments, the filament may be bonded to the spherical core and/or outer layers during deposition. With reference now to FIG. 14, at 106B, the winding of the filament may, alternatively, be conducted by 3D printing.

Figure 15:
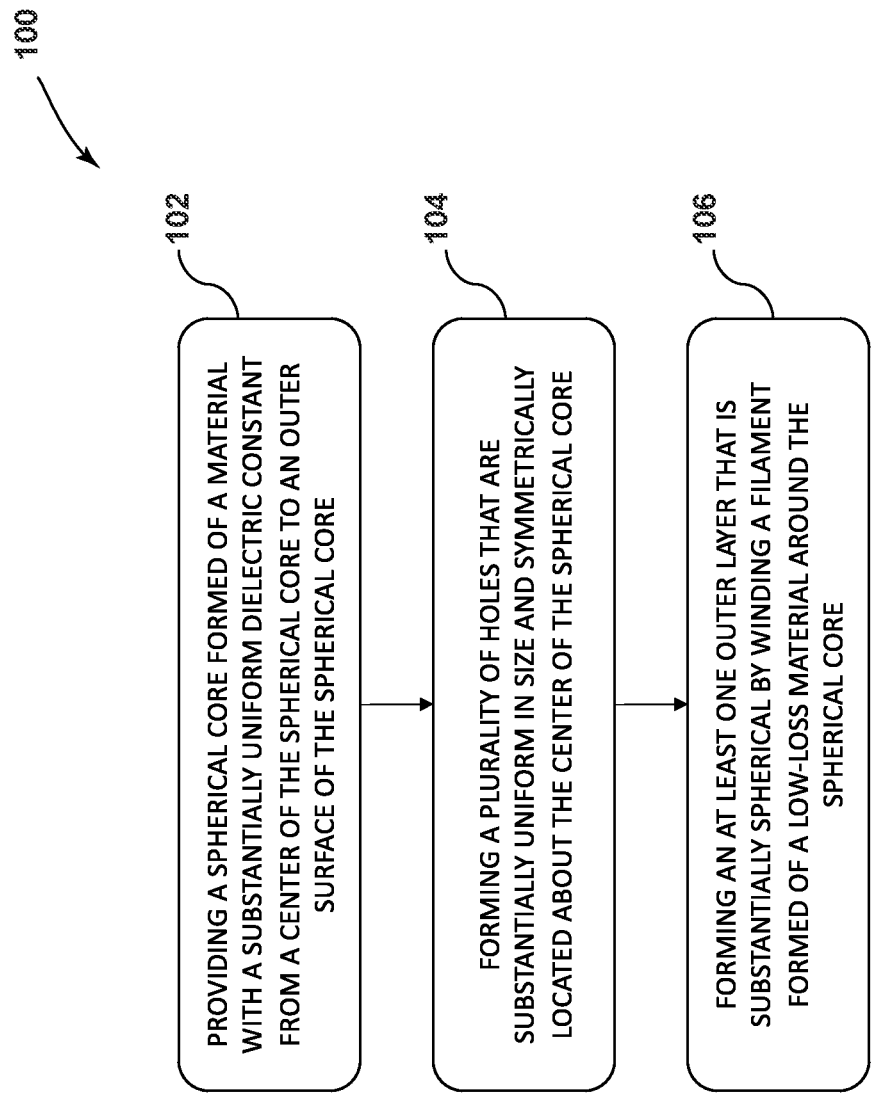
FIG. 15 is a method flow chart of a first fabrication process of forming a Luneburg lens in accordance with one aspect of the disclosure.

With reference now to FIG. 15, the method 100 may, therefore, include, at 102, providing a spherical core formed of a material with a substantially uniform dielectric constant from a center of the spherical core to an outer surface of the spherical core. At 104, the method 100 may further include forming a plurality of holes that are substantially uniform in size and symmetrically located about the center of the spherical core. At 106, the method 100 may further include forming an at least one outer layer that is substantially spherical by winding a filament formed of a low-loss material around the spherical core.

Figure 16:
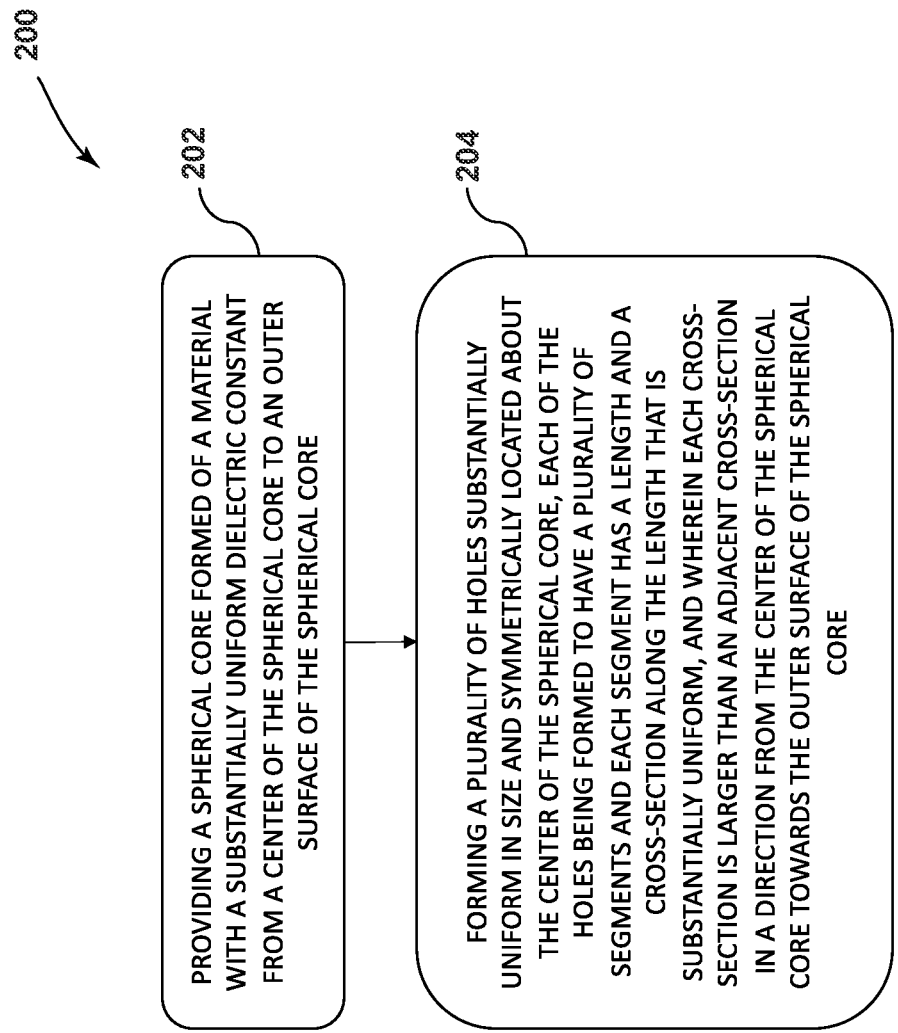
FIG. 16 is a method flow chart of a second fabrication process of forming a Luneburg lens in accordance with one aspect of the disclosure.

With reference now to FIG. 16, a second method 200 of forming a Luneburg lens is illustrated. At 202, a spherical core is provided that is formed of a material with a substantially uniform dielectric constant from a center of the spherical core to an outer surface of the spherical core. For example, the spherical core may be formed of PTFE material. At step 204, a plurality of holes are formed that are substantially uniform in size and symmetrically located about the center of the spherical core (e.g., similar to the process in FIG. 12). With continued reference to step 204, each of the holes are formed to have a plurality of segments and each segment has a length and a cross-section along the length that is substantially uniform. Further to step 204, each cross-section is larger than an adjacent cross-section in a direction from the center of the spherical core towards the outer surface of the spherical core. For example, each of the holes may be formed to have a configuration comprising a first hole construction, a second hole construction, a construction with two or more segments, or a construction with four or more segments. The plurality of holes may include a distribution comprising one of a first hole distribution or a second hole distribution. In some embodiments, the method 200 may result in a Luneburg lens without an outer layer. In this manner, the outer surface of the spherical core defines an outer surface of the Luneburg lens.

Figure 17:
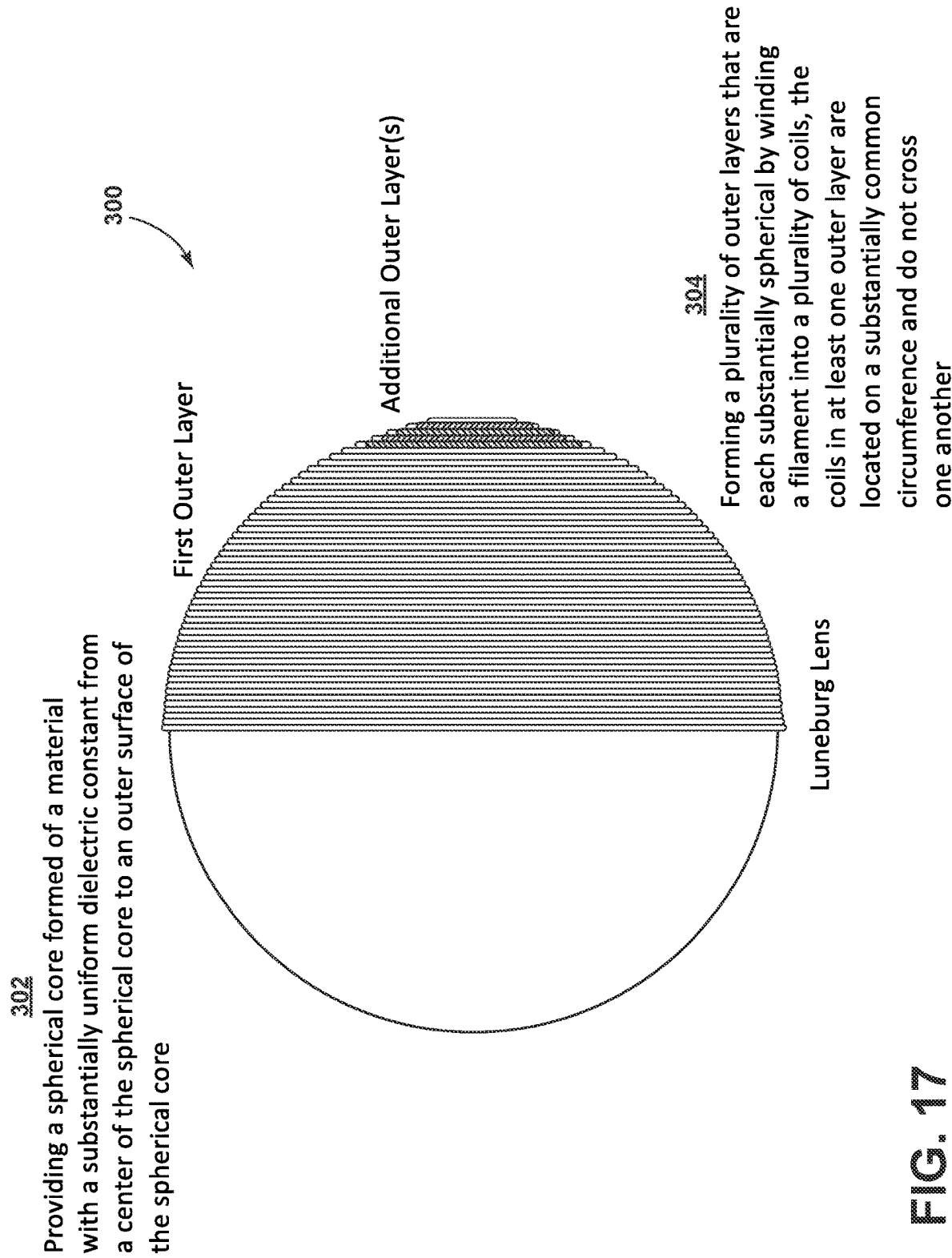
FIG. 17 is a front view of a second process of forming an outer layer including a filament winding about a core in accordance with one aspect of the disclosure.
Figure 18:
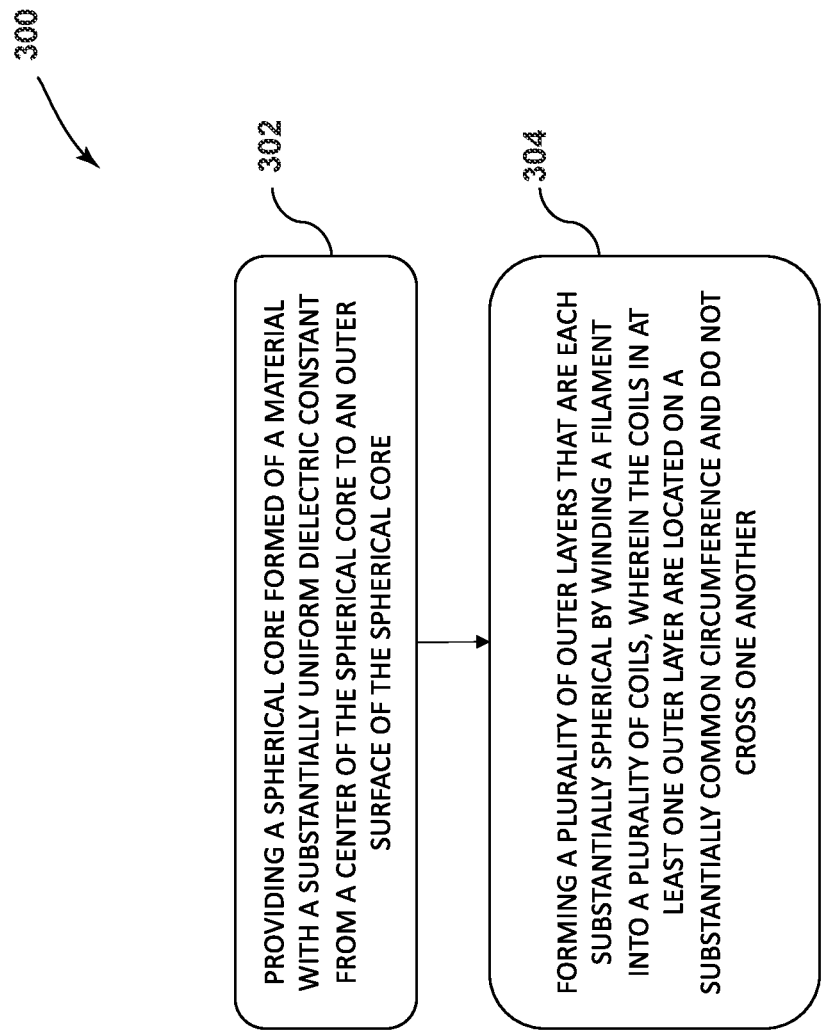
FIG. 18 is a method flow chart of a third fabrication process of forming a Luneburg lens in accordance with one aspect of the disclosure.

With reference now to FIGS. 17 and 18, a third method 300 of forming a Luneburg lens is illustrated. As shown in FIG. 18, and by reference numeral 302, a spherical core is provided that is formed of a material with a substantially uniform dielectric constant from a center of the spherical core to an outer surface of the spherical core. For example, the spherical core may be formed of PTFE material. At step 304, the method 300 includes forming a plurality of outer layers that are each substantially spherical by winding a filament into a plurality of coils. The plurality of outer layers includes a first outer layer and at least one additional outer layer as highlighted in grey and discussed in references to FIGS. 1-4. It should be appreciated that the coils in the at least one additional outer layer may cross the coils from the adjacent outer layer. With continued reference to step 204, the coils in at least one outer layer are located on a substantially common circumference and do not cross one another. The filament may be formed from at least one of PLA or PETG or formed of an optical fiber. For example, the filament may be already formed and the already-formed filament may be unspooled and/or otherwise uncoiled and wrapped around the spherical core (FIG. 13). Alternatively, the winding of the filament may, alternatively, be conducted by 3D printing (FIG. 14). In some embodiments, the method 300 may result in a Luneburg lens without any holes. In this manner, the spherical core may be substantially solid and may include a dielectric constant of about 2.

The invention disclosed herein is further summarized in the following paragraphs and is further characterized by combinations of any and all of the various aspects described therein.

According to one aspect of the disclosure, a method of forming a Luneburg lens is provided. The method includes providing a spherical core formed of a material with a substantially uniform dielectric constant from a center of the spherical core to an outer surface of the spherical core. The method further includes forming a plurality of holes that are substantially uniform in size and symmetrically located about the center of the spherical core. The method further includes forming an at least one outer layer that is substantially spherical by winding a filament formed of a low-loss material around the spherical core.

According to a related aspect, winding the filament is conducted by 3D printing.

According to a related aspect, the low-loss material of the filament comprises at least one of polylactide or polyethylene terephthalate glycol.

According to a related aspect, the low-loss material of the filament is formed of an optical fiber.

According to a related aspect, the optical fiber includes an outer polymer coating and an inner glass core.

According to a related aspect, winding the filament is conducted such that at least one of the at least one outer layer defines a plurality of coils that are located on a substantially common circumference and do not cross one another.

According to a related aspect, each coil is substantially in abutting relationship with adjacent coils on the substantially common circumference.

According to a related aspect, each coil is substantially uniformly spaced from adjacent coils on the substantially common circumference.

According to a related aspect, each of the holes are formed to have a plurality of segments and each segment defines a cross-section, each cross-section larger than an adjacent cross-section in a direction from the center of the spherical core towards the outer surface of the spherical core.

According to a related aspect, each segment has a length and the cross-section of each segment is substantially uniform along the length.

According to a related aspect, the plurality of segments includes three or more segments.

According to a related aspect, each hole is formed by drilling with a stepped drill bit.

According to a related aspect, the material of the spherical core is substantially solid and homogeneous prior to forming the plurality of holes and includes a dielectric constant between about 2 and about 5.

According to a related aspect, the material of the spherical core includes polytetrafluoroethylene.

According to one aspect of the disclosure, a method of forming a Luneburg lens is provided. The method includes providing a spherical core formed of a material with a substantially uniform dielectric constant from a center of the spherical core to an outer surface of the spherical core. The method further includes forming a plurality of holes substantially uniform in size and symmetrically located about the center of the spherical core. Each of the holes are formed to have a plurality of segments and each segment has a length and a cross-section along the length that is substantially uniform. Each cross-section is larger than an adjacent cross-section in a direction from the center of the spherical core towards the outer surface of the spherical core.

According to a related aspect, each hole is formed by drilling with a stepped drill bit.

According to a related aspect, the length of at least two of the plurality of segments are different.

According to one aspect of the disclosure, a method of forming a Luneburg lens is provided. The method includes providing a spherical core formed of a material with a substantially uniform dielectric constant from a center of the spherical core to an outer surface of the spherical core. The method further includes forming a plurality of outer layers that are each substantially spherical by winding a filament into a plurality of coils. The coils in at least one outer layer are located on a substantially common circumference and do not cross one another.

According to a related aspect, the filament is formed of an optical fiber that includes an outer polymer coating and an inner glass core.

According to a related aspect, winding the filament is conducted by 3D printing.

Many variations and modifications may be made to the above-described embodiments of the disclosure without departing substantially from the spirit and various principles of the disclosure. All such modifications and variations are intended to be included herein within the scope of this disclosure and protected by the following claims. It will be understood that any described processes or steps within described processes may be combined with other disclosed processes or steps to form structures within the scope of the present disclosure. The exemplary structures and processes disclosed herein are for illustrative purposes and are not to be construed as limiting.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A method of forming a Luneburg lens, comprising:
providing a spherical core formed of a material with a substantially uniform dielectric constant from a center of the spherical core to an outer surface of the spherical core;
forming a plurality of holes substantially uniform in size and symmetrically located about the center of the spherical core; and
forming an at least one outer layer that is substantially spherical by winding a filament formed of a low-loss material around the spherical core.

2. The method according to claim 1, wherein winding the filament is conducted by 3D printing.

3. The method according to claim 2, wherein the low-loss material of the filament comprises at least one of polylactide or polyethylene terephthalate glycol.

4. The method according to claim 1, wherein the low-loss material of the filament is formed of an optical fiber.

5. The method according to claim 4, wherein the optical fiber includes an outer polymer coating and an inner glass core.

6. The method according to claim 1, wherein winding the filament is conducted such that at least one of the at least one outer layer defines a plurality of coils that do not cross one another.

7. The method according to claim 6, wherein each coil is substantially in abutting relationship with adjacent coils.

8. The method according to claim 6, wherein each coil is substantially uniformly spaced from adjacent coils.

9. The method according to claim 1, wherein each of the holes are formed to have a plurality of segments and each segment defines a cross-section, each cross-section larger than an adjacent cross-section in a direction from the center of the spherical core towards the outer surface of the spherical core.

10. The method according to claim 9, wherein each segment has a length and the cross-section of each segment is substantially uniform along the length.

11. The method according to claim 10, wherein the plurality of segments includes three or more segments.

12. The method according to claim 10, wherein each hole is formed by drilling with a stepped drill bit.

13. The method according to claim 1, wherein the material of the spherical core is substantially solid and homogeneous prior to forming the plurality of holes and the substantially uniform dielectric constant is between about 2 and about 5.

14. The method according to claim 13, wherein the material of the spherical core includes polytetrafluoroethylene.

* * * * *